Feb. 8, 1966
HACHIO INAMURA
3,233,845
SPINNING TYPE FISHING REEL
Filed Dec. 28, 1962
2 Sheets-Sheet 1
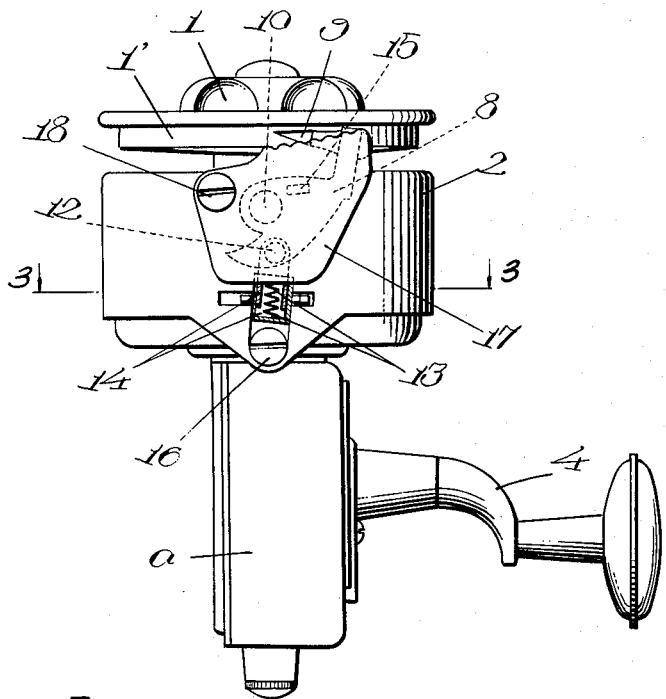
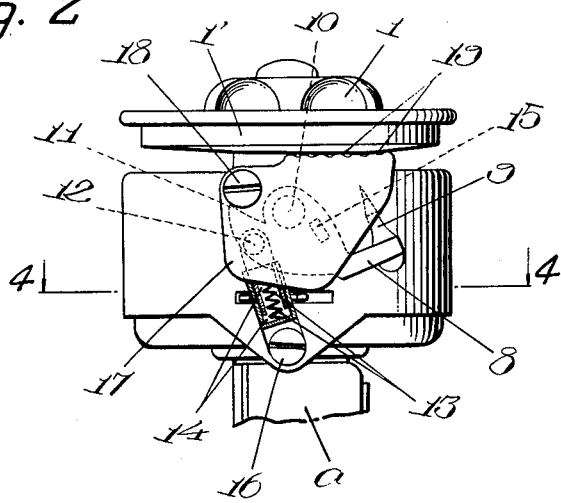
INVENTOR.
HACHIO INAMURA Feb. 8, 1966 HACHIO INAMURA 3,233,845
SPINNING TYPE FISHING REEL
Filed Dec. 28, 1962 2 Sheets-Sheet 2

INVENTOR.
HACHIO INAMURA
BY

United States Patent Office 3,233,845
Patented Feb. 8, 1966

3,233,845
SPINNING TYPE FISHING REEL
Hachio Inamura, 95 Shimura Nakadai-cho,
Itabashi-ku, Tokyo, Japan
Filed Dec. 28, 1962, Ser. No. 248,148
Claims priority, application Japan, Aug. 23, 1962,
37/36,327
5 Claims. (Cl. 242—84.2)

This invention relates to spinning-type fishing reels and, more particularly, to a spinning-type fishing reel including a line engaging or pick-up pin and improved and simplified means for manually moving said pin to the inoperative position when it is desired to reel out a lien and for automatically restoring the pin to the line pick-up position responsive to reeling in of the line.

One object of the present invention is to provide a spinning-type fishing reel including a line engaging or pick-up pin mounted on the external surface of a cylindrical rotor or cup which is coaxial with a spool and rotatable relative thereto, with the pick-up pin being movable to the line disengaging or reeling off position by manual actuation of an operator by one finger.

Another object of the present invention is to provide a spinning-type fishing reel including a line pick-up pin operating, during reeling in of the line, within the axial confines of a spool so that the reeling in operation is smooth and certain.

Still another object of the present invention is to provide a spinning-type fishing reel wherein the operations of reeling in and reeling off of the line are simplified, increasing utility of the reel and contributing to the pleasure derived from fishing.

In a conventional open face spinning-type fishing reel, as is known to those skilled in the art, a semi-annular line guide rod or bail is mounted on a rotor or cup for projection outwardly over the reel or retraction inwardly of the reel. A roller is mounted on this line guide rod adjacent one base or connection point thereof to guide the line. Furthermore, as the line is guided and reeled in only by the roller provided on the line guide rod, the movement of the line is often retarded, or the line may become entangled, during reeling in. For this reason, open face spinning-type fishing reels of this type have not been fully satisfactory in operation.

The present invention is directed to an open face spinning-type fishing reel which is free of the aforementioned defects of conventional open face spinning-type fishing reels. To this end, the reel of the present invention comprises a line guiding or pick-up pin which is mounted on a plate connected to a toggle means. This toggle means biases the plate either to a position in which the pick-up pin is in operative association with the spool, or to a position in which the pin is retracted from operative association with the spool. Such retraction can be effected manually by merely pressing, with one finger, upon an oscillatable plate operator. Automatic return of the pin to the line guiding or pick-up position is effected responsive to rotation of the reel in a reeling in direction.

For an understanding of the principles of the invention, reference is made to the following description of a typical embodiment thereof as illustrated in the accompanying drawings.

In the drawings:

FIG. 1 is a plan view, partly broken away, showing a reel embodying the invention with the line guiding or pick-up pin in operative position;

FIG. 2 is a partial plan view, corresponding to FIG. 1, showing the reel with the line guiding or pick-up pin in the inoperative or retracted position;

Figure 3:
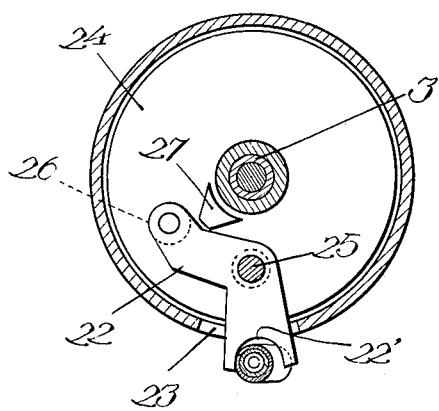
Figure 4:
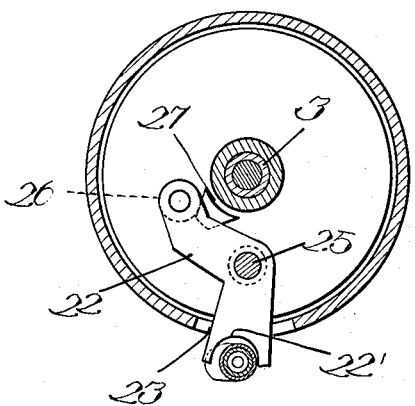
Figure 6:
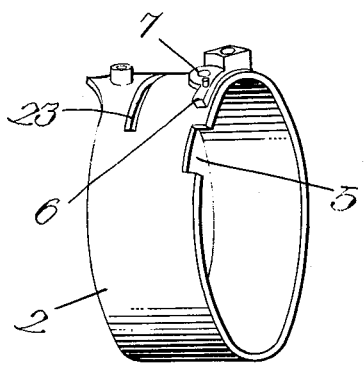
Figure 5:
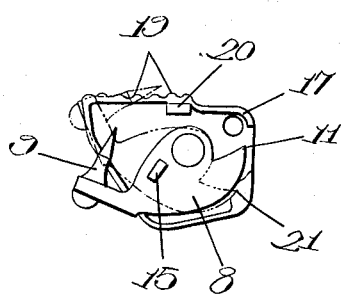

FIG. 3 is a section taken on the line 3—3 of FIG. 1;
FIG. 4 is a section taken on the line 4—4 of FIG. 2;
FIG. 5 is a bottom plan view of the mechanism for moving the line guiding or pick-up pin to its retracted position; and
FIG. 6 is a perspective view of the rotor or cup;

Referring to the drawings in particular, a reel embodying the invention includes a spool 1 rotatably mounted at the forward portion of the main body *a* of the reel. This spool includes an outer front disc formed with a step periphery 1'. Spool 1 is provided with an adjustable brake by means of which the force required to rotate the spool in the unwinding direction may be regulated. In a known manner, spool 1 is reciprocated axially of the reel when the line is to be reeled in, and the line is wound around spool 1 by operation of the rotating mechanism in the main body *a* of the reel.

A cylindrical rotor or cup 2, of relatively short axial extent and having a partition or wall adjacent its inner end, is secured to a rotating shaft 3 for rotation by handle 4 through gearing in body *a*, in the known manner. Referring to FIG. 6, a notch 5 is provided in the periphery of rotor 2 and, on one side of notch 5, there is an abutment 7 having an extension 6.

An oscillatably mounted plate 8 has a line guiding or pick-up pin 9 secured thereto, line guiding pin 9 in cooperation with plate 8 having the appearance of a hook. At approximately its center, plate 8 is oscillatably secured to projection 7 by means of a set screw 10 serving as a pivot for the plate. Plate 8 is formed with a hook-shaped abutment 11 and, at the base of this abutment, one end of one sleeve of a pair of telescoped sleeves 14, 14 is secured by a stud or screw 12. A compression coil spring 13 is seated within the sleeves 14, 14, and the other sleeve 14 is secured by a screw 16 to an extension of rotor 12. The telescoped sleeves 14, 14 with their contained spring 13 act in the nature of a substantially rectilinear toggle link resiliently biased to the extended position.

That portion of plate 8 carrying the pin 9 is formed as a substantially rectilinear arm which is substantially parallel to a diameter through screw 10. Between this rectilinear portion and the screw 10, plate 8 carries an abutment 15 which is engageable with the extension 6 of projection 7.

The line engaging or pick-up pin 9, which is substantially needle-shaped, is screwed into its supporting arm on the oscillatable plate 8 and, in the reeling-in position of FIG. 1, pin 9 occupies a position where it extends substantially parallel to the direction of rotation of spool 1. In the axially innermost position of the spool, pin 9 is aligned with the ledge or step 1' or the front or forward disc of the spool. This facilitates reeling-in of the line. In this position of pin 9, the toggle link comprising spring 13 and telescoped sleeves 14, 14 is acting on plate 8 in such a manner as to rotate it counterclockwise as viewed in FIG. 1. When plate 8 is oscillated in a clockwise direction, against the force of the toggle link 13–14, 14, and when the toggle link passes its dead center position, plate 8 is snapped to the position of FIG. 2 wherein pin 9 is retracted from operative association with spool 1. The limit of this movement is provided by the claw or hook 11 engaging projection 7 of rotor 2, and pin 9 is maintained in this position by virtue of the toggle mechanism.

A generally trapezoidal-shaped operating plate 17 is oscillatably mounted on rotor 2 by means of a screw 18, and is spring biased (by a spring not shown) to rotate in a counterclockwise direction, screw 18 being secured in projection 7. Plate 17 may have a portion of one edge formed with corrugations or knurls 19 for convenience of operation by one finger. The inner surface of plate 17 is formed with a projection 20 and with an abutment 21, these projections being spaced from each other. These projections are cooperable with the claw 11 of plate 8. Projections 20 and 21 limit oscillation of plate 17 relative to plate 8.

When oscillatable operating plate 17 is moved clockwise from the position shown in FIG. 1, as by pressing a finger against corrugations 19, projection 20, after a short relative oscillation of plate 17, engages an edge of plate 8 to move this plate in a clockwise direction and, as the toggle link 13–14, 14 passes its dead center position, plate 8 is oscillated to the position of FIG. 2. In so moving, plate 8 engages projection 21 of plate 17 and moves plate 17 to the position of FIG. 2. The movement of plate 8 in either direction is limited by the abutment 15 cooperating with the projection 6–7.

An angular lever 22 is pivoted to the base of rotor 2 as by a pin or bolt 25. The outer end of lever 22 is formed as a fork 22' which embraces, with clearance, the toggle link sleeves 14, 14. The outer leg of lever 22 extends through an arcuately elongated slot 23 in the side wall of rotor 2. The base of rotor 2 is spaced somewhat outwardly or forward of the inner or rear edge thereof and in spaced parallel relation to the front wall 24 of body a, rotor 2 embracing, with clearance, the rim of said front wall 24. Pin 25 is secured to the base of rotor 2. The inner end of lever 22 carries roller 26 which is rotatable thereon and cooperable with a cam or abutment 27 mounted on fixed front wall 24.

The arrangement thus described operates in essentially the following manner. During reeling-in of the line, line pick-up pin 9 occupies the position shown in FIG. 1 in which it projects in the area of the spool 1. By turning handle 4 counterclockwise, as viewed looking inwardly from the operating end of the handle, pin 9 is revolved simultaneously with rotation of rotor 2, relative to spool 1, and lays the line around the spool as the latter is axially reciprocated. If the line is to be reeled out, as for casting, the user presses corrugations 19 of plate 17 with his finger, rotating plate 17 clockwise as viewed in FIG. 1. Abutment 21 of plate 17 disengages plate 8, and abutment 20 of plate 17 engages the opposite side of plate 8 to oscillate plate 8 clockwise. When the toggle link 13–14, 14 passes dead center, plate 8 is snapped quickly in a counterclockwise direction until abutment 15 engages abutment 6–7. This retracts pin 9 to the retracted position of FIG. 2, so that the pin is out of operative relation with spool 1. The line may then be unreeled over the forward flange of spool by the force of a bait attached to the line.

During such manually actuated retraction of pin 9, roller 26 on lever 22 is moved from the position of FIG. 3 to the position of FIG. 4, where it is in the relative path of movement of abutment 27. If rotor 2 is now rotated in the reeling-in direction by rotating handle 4 in a counterclockwise direction viewed from the right of FIG. 1, roller 26 will engage abutment 27 and will swing lever 22 clockwise from the position of FIG. 3 to the position of FIG. 4. Through its forked end 22' embracing the toggle link, the movement of lever 22 swings toggle link 13–14, 14 from the position of FIG. 2 to the position of FIG. 1 and, as the toggle link passes through dead center, it snaps plate 8 to the position of FIG. 1. Such movement continues until abutment 15 engages extension 6 of projection or abutment 7 of rotor 2, and pick-up pin 9 is moved into operative relation with spool 1. At the same time, interengagement between plate 8 and abutment 20 of plate moves plate 17 to the position shown in FIG. 1.

With the described reel, in which the pin 9 is mounted on the exterior surface of rotor 2 for cooperation with the spool 1, and in which a toggle spring mechanism 13–14, 14 is provided for snapping the plate 8 to either one of its two positions, the line guiding pin 9 can be moved quickly in either direction, that is, from the operative position of FIG. 1 to the retracted position of FIG. 2, and vice versa. Only one finger is needed to effect movement of pin 9 from the position of FIG. 1 to the position of FIG. 2, and it will be noted that pin 9 guides the line onto the spool 1 inwardly of the front or outer element thereof and without crossing the front element. Therefore, the line can be easily guided onto the spool without snagging or entangling of the cast off line. Consequently, the reeling-in operation can be effected smoothly and accurately.

While a specific embodiment of the invention has been shown and described in detail to illustrate the application of the principles of the invention, it will be understood that the invention may be embodied otherwise without departing from such principles.

I claim:

1. In a spinning reel of the type comprising a gear housing, a spool normally non-rotative but axially reciprocable relative to said housing, a substantially cylindrical rotor rotatable relative to said spool, and driving means on said housing for axially reciprocating said spool and rotating said rotor: the improvement comprising, in combination, a plate; means mounting said plate on said rotor for oscillation about a radius of the latter; a line pick-up pin on said plate and movable therewith between an operative position in proximity to said spool and a retracted position remote from said spool; a substantially rectilinearly extendable two-part toggle link pivotally connected at one end to said rotor and at the other end to said plate, and including spring means biasing said link to its extended position to maintain said pin in either position thereof; cooperating abutment means on said plate and on said rotor limiting movement of said plate to the respective positions of said pin; a manually actuable operator; means oscillatably mounting said operator on said rotor in operative association with said plate; abutment means on said operator engageable with said plate, upon actuation of said operator when said pin is in its operative position, to oscillate said plate and to compress said link to snap said plate to the retracted position of said pin for unreeling of line from said spool; and a member mounted on said rotor and engaged with said link, said member being engageable with said housing upon rotation of said rotor in a line reeling-in direction, to swing said toggle link in a direction to oscillate said plate to the operative position of said pin.

2. In a spinning reel of the type comprising a gear housing, a spool normally non-rotative but axially reciprocable relative to said housing, a substantially cylindrical rotor rotatable relative to said spool, and driving means on said housing for axially reciprocating said spool and rotating said rotor: the improvement comprising, in combination, a plate; means mounting said plate on said rotor for oscillation about a radius of the latter; a line pick-up pin on said plate and movable therewith between an operative position in proximity to said spool and a retracted position remote from said spool; a substantially rectilinearly extendable two-part toggle link pivotally connected at one end to said rotor and at the other end to said plate, and including spring means biasing said link to its extended position to maintain said pin in either position thereof; cooperating abutment means on said plate and on said rotor limiting movement of said plate to the respective positions of said pin; a manually actuable operator; means oscillatably mounting said operator on said rotor in operative association with said plate; abutment means on said operator engageable with said plate, upon actuation of said operator when said pin is in its operative position, to oscillate said plate and to compress said link to snap said plate to the retracted position of said pin for unreeling of line from said spool; a member mounted on said rotor and engaged with said link and moved by the latter to a first position responsive to such manual actuation of said operator; and means fixed on said housing and in the path of movement of said member in such first position of the latter, and effective, upon rotation of said rotor in a line reeling-in direction, to engage said member to swing said toggle link in a direction to oscillate said plate to the operative position of said pin.

3. In a spinning reel of the type comprising a gear housing, a spool normally non-rotative but axially reciprocable relative to said housing, a substantially cylindrical rotor rotatable relative to said spool, and driving means on said housing for axially reciprocating said spool and rotating said rotor: the improvement comprising, in combination, a plate; means mounting said plate on said rotor for oscillation about a radius of the latter; a line pick-up pin on said plate and movable therewith between an operative position in proximity to said spool and a retracted position remote from said spool; a substantially rectilinearly extendable two-part toggle link pivotally connected at one end to said rotor and at the other end to said plate, and including spring means biasing said link to its extended position to maintain said pin in either position thereof; cooperating abutment means on said plate and on said rotor limiting movement of said plate to the respective positions of said pin; a manually actuable operator; means oscillatably mounting said operator on said rotor in operative association with said plate; abutment means on said operator engageable with said plate, upon actuation of said operator when said pin is in its operative position, to oscillate said plate and to compress said link to snap said plate to the retracted position of said pin for unreeling of line from said spool; a lever pivotally mounted on said rotor intermediate its ends, and extending transversely of said rotor; said lever having an outer end embracing said toggle link and movable thereby, and an inner end; and a stop on said housing normally out of the path of movement of said inner end of said lever; said lever, upon movement of said pin to the retracted position, being moved by said link to a first position in which its inner end has a path of movement intersected by said stop for engagement of said lever by said stop, upon rotation of said rotor in a line reeling-in direction, to swing said lever to swing said toggle link in a direction to oscillate said plate to the operative position of said pin.

4. In a spinning reel of the type comprising a gear housing, a spool normally non-rotative but axially reciprocable relative to said housing, a substantially cylindrical rotor rotatable relative to said spool, and driving means on said housing for axially reciprocating said spool and rotating said rotor: the improvement comprising, in combination, a plate; means mounting said plate on said rotor for oscillation about a radius of the latter; a line pick-up pin on said plate and movable therewith between an operative position in proximity to said spool and retracted position remote from said spool; a substantially rectilinearly extendable two-part toggle link pivotally connected at one end to said rotor and at the other end to said plate, and including spring means biasing said link to its extended position to maintain said pin in either position thereof; cooperating abutment means on said plate and on said rotor limiting movement of said plate to the respective positions of said pin; a manually actuable operator; means oscillatably mounting said operator on said rotor in operative association with said plate; abutment means on said operator engageable with said plate, upon actuation of said operator when said pin is in its operative position, to oscillate said plate and to compress said link to snap said plate to the retracted position of said pin for unreeling of line from said spool; said rotor having a circular base wall extending thereacross forwardly of the inner end thereof; said housing having a circular plate in spaced parallel relation to said base wall; a lever; means pivotally mounting said lever, intermediate its ends, on said circular base wall for oscillation in a diametric plane of said rotor, said lever having an outer end projecting through an arcuate slot in the cylindrical wall of said rotor and embracing said toggle link; lever having an inner end extending toward the axis of said rotor; a stop on said circular plate positioned so that it is normally out of the path of movement of the inner end of said lever; said lever, upon movement of said pin to the retracted position, being swung by said toggle link to a position wherein its inner end has a path of movement intersected by said stop; the inner end of said lever being engageable by said stop, upon rotation of said rotor in a line reeling-in direction, to swing said lever to swing said toggle link in a direction to oscillate said first-named plate to the operative position of said pin.

5. In a spinning reel, the improvement as claimed in claim 4, in which said substantially rectilinearly extendable two-part toggle link comprises a pair of telescoped tubular sleeves enclosing said spring means; said lever having a forked outer end embracing said sleeves; and a roller on the inner end of said lever engageable with said stop.

References Cited by the Examiner
UNITED STATES PATENTS

| | | | |
|---|---|---|---|
| 2,229,470 | 1/1941 | Pezon | 242—84.21 |
| 2,942,798 | 6/1960 | Alinari | 242—84.2 |
| 2,966,314 | 12/1960 | Mombur | 242—84.21 |
| 3,107,876 | 10/1963 | Ament | 242—84.21 |

FOREIGN PATENTS 136,660   7/1952   Sweden.

MERVIN STEIN, *Primary Examiner.*